(12) United States Patent
Ito et al.

(10) Patent No.: US 6,392,737 B1
(45) Date of Patent: May 21, 2002

(54) PROCESSING APPARATUS AND METHOD OF CONTROL

(75) Inventors: Masanobu Ito, Kawasaki; Norihiko Hara, Oyama, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/130,466

(22) Filed: Aug. 7, 1998

(51) Int. Cl.[7] .................. G03B 27/52; G03B 27/58; G03B 27/62
(52) U.S. Cl. ............. 355/30; 355/72; 355/75; 250/492.1
(58) Field of Search .................. 355/27, 30, 53, 355/72, 75; 414/416; 250/492.1

(56) References Cited

U.S. PATENT DOCUMENTS

| | | | | |
|---|---|---|---|---|
| 3,857,334 A | * | 12/1974 | Arp ................. | 100/53 |
| 4,757,355 A | * | 7/1988 | Iizuka et al. ............ | 355/75 |
| 5,097,136 A | * | 3/1992 | Meyer et al. ........... | 250/492.1 |
| 5,563,682 A | * | 10/1996 | Aikawa et al. .......... | 355/53 |
| 5,825,470 A | * | 10/1998 | Miyai et al. ........... | 355/72 |

FOREIGN PATENT DOCUMENTS

| | | |
|---|---|---|
| JP | A-8-167561 | 6/1996 |
| JP | 8-250409 | 9/1996 |
| JP | 8-321458 | 12/1996 |
| JP | 8-330217 | 12/1996 |

* cited by examiner

*Primary Examiner*—Russell Adams
*Assistant Examiner*—Rodney Fuller
(74) *Attorney, Agent, or Firm*—Oliff & Berridge PLC

(57) ABSTRACT

A processing apparatus processes an object, and includes at least first and second processing devices that are separated from each other by a partition. The apparatus includes a first housing that covers the first processing device, and a second housing that covers the second processing device. The second housing includes a first door device that is capable of opening the second housing. The apparatus also includes a controller having a CPU to control the first and second processing devices in accordance with a state of the first door device. The controller stops at least a part of the second processing device, and does not stop at least a part of the first processing device, when the first door device opens the second housing.

26 Claims, 8 Drawing Sheets

PROCESSING APPARATUS AND METHOD OF CONTROL

BACKGROUND OF THE INVENTION

1. Field of the Invention

The present invention relates to a processing apparatus, such as an exposure apparatus used for manufacturing semiconductors, LCD panels, or the like, and a method of controlling the processing apparatus.

2. Description of the Related Art

In recent years, projection type exposure apparatuses of step-and-repeat type or step-and-scan type have been widely used in a lithography process in the manufacture of semiconductor devices or liquid crystal display elements. The apparatuses of these types function to transfer a pattern of a mask or reticle (hereinafter referred to as "reticle") onto a photosensitive substrate (a semiconductor wafer or glass plate with a surface on which a resist layer is formed).

In such an apparatus, environments (such as a temperature, pressure, and a cleanliness level) in the inside of its chamber need to be maintained in desired ranges. To this end, an opening or openings of the apparatus is/are designed to be as small as possible. On the other hand, it is sometimes necessary to perform some operations within the apparatus, for example, loading/unloading of reticles, and maintenance of the inside parts of the apparatus.

A conventional example as disclosed in Japanese laid-open Patent Publication No. 8-167561 has been known in the art. In this example, input means is provided for requiring a door of a chamber to be unlocked, and the following operation is performed in response to the request for unlocking received from the input means. Where a request for unlocking is made while a manipulator is being stopped, the manipulator is suspended, and the door is unlocked at the same time. Where there is a possibility of interference with an operation, only the operation of the manipulator is controlled. Where a request for unlocking the door is received while the manipulator is in operation, the door is unlocked only after the operation proceeds and comes to a stop.

In case that the manipulator is not normally stopped for a moment upon unlocking of the door, the manipulator is controlled so that it is instantly stopped when the door is unlocked during the operation of the manipulator.

However, the above-described control method of the manipulator has a problem as described below.

In general, numerous driven parts, and others, are present in the interior of the apparatus. In the above-described method, only such manipulators that have a possibility of interfering with the operation are stopped. Thus, part of driven parts may keep operating, and an operator needs to pay attention to the driven parts that are not being stopped.

SUMMARY OF THE INVENTION

It is therefore an object of the present invention to provide a processing apparatus which achieves simplification of operations performed inside the apparatus, and reduction of time required for the operations, while assuring safety of an operator, and also provide a method of controlling such a processing apparatus.

To accomplish the object, the interior of the apparatus is divided by a partition into a plurality of areas. Each of the areas is controlled as a unit, assuring both the safety of the operator and high operating efficiency of the apparatus.

The apparatus of the present invention includes an area in which the safety of the operator is ensured, and an area in which the apparatus operates without fail. The area where the safety of the operator is ensured and the area where the operation of the apparatus is ensured are determined by detecting movement of the operator who enters the inside of the apparatus.

In the apparatus of the present invention, a door provided at each area has a means for sensing opening of the door, so as to detect movement of the operator who enters the inside of the apparatus. Then, a controller recognizes the relationship between opening of the chamber door and the area. Further, the controller automatically stops driving certain parts which may endanger the operator in the area, based on the relationship between the opened door and the area.

The following are advantages provided by the above arrangement.

(1) Since all of driven parts which may endanger the operator in the area are normally set to be stopped, the safety of the operator in the area is ensured.

(2) Parts (or components) that are set to be driven are not stopped in an area or areas other than the area in which opening of a door has been recognized, and therefore the apparatus is kept operating.

(3) The interior of the apparatus may be divided into an increased number of areas. With the number of areas thus increased, the number of driven parts that are stopped during the operation can be further reduced. As a result, the work time required for the apparatus to resume its normal operation can be reduced.

Thus, according to the present invention, the operation required for the apparatus to resume its normal function is simplified with reduced time, while assuring the safety of the operator.

DESCRIPTION OF THE PREFERRED EMBODIMENT(S)

Figure 1:
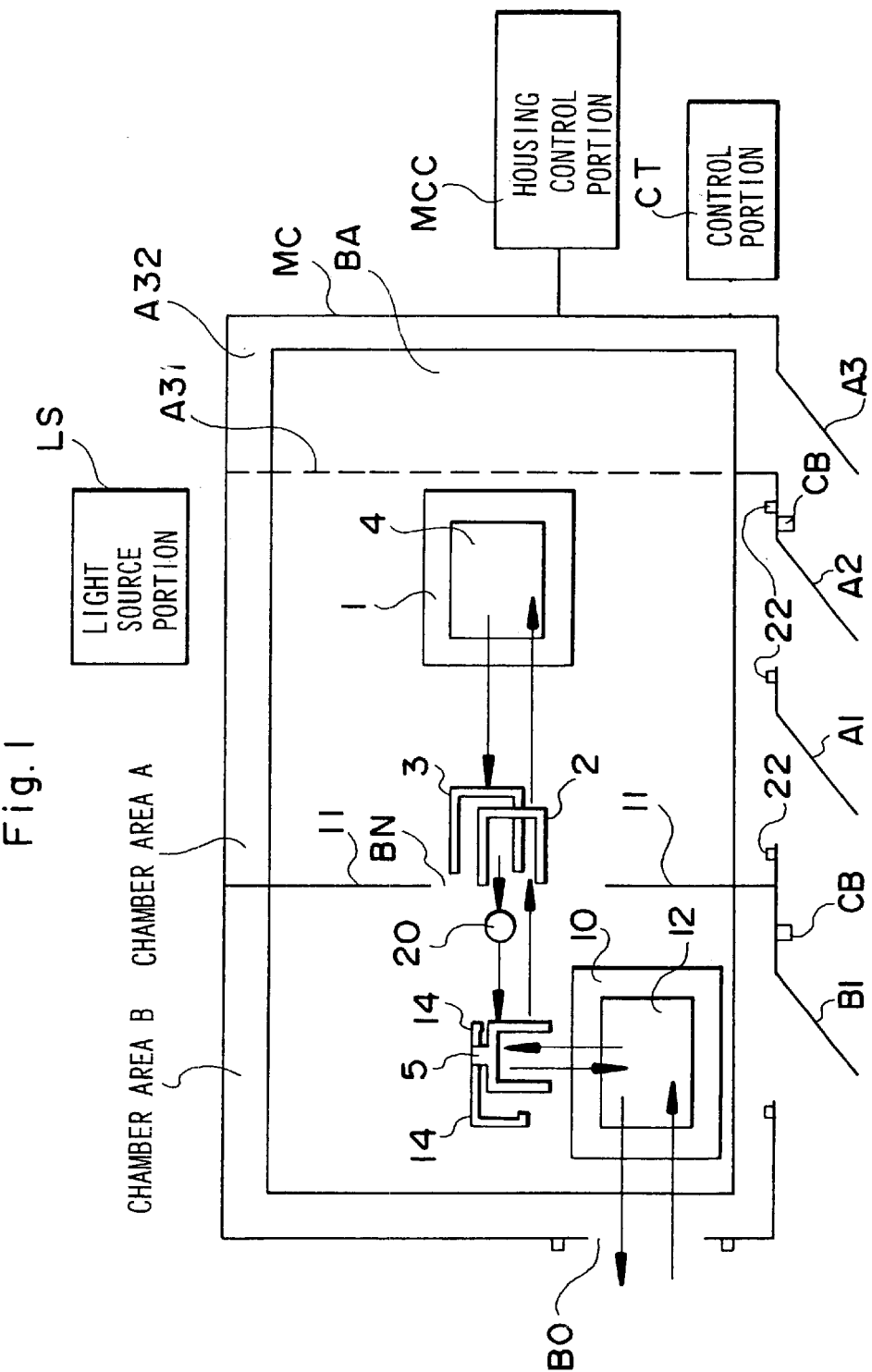
FIG. 1 is a schematic view of an exposure apparatus of one embodiment of the present invention, as viewed from the top face of the apparatus.
Figure 2:
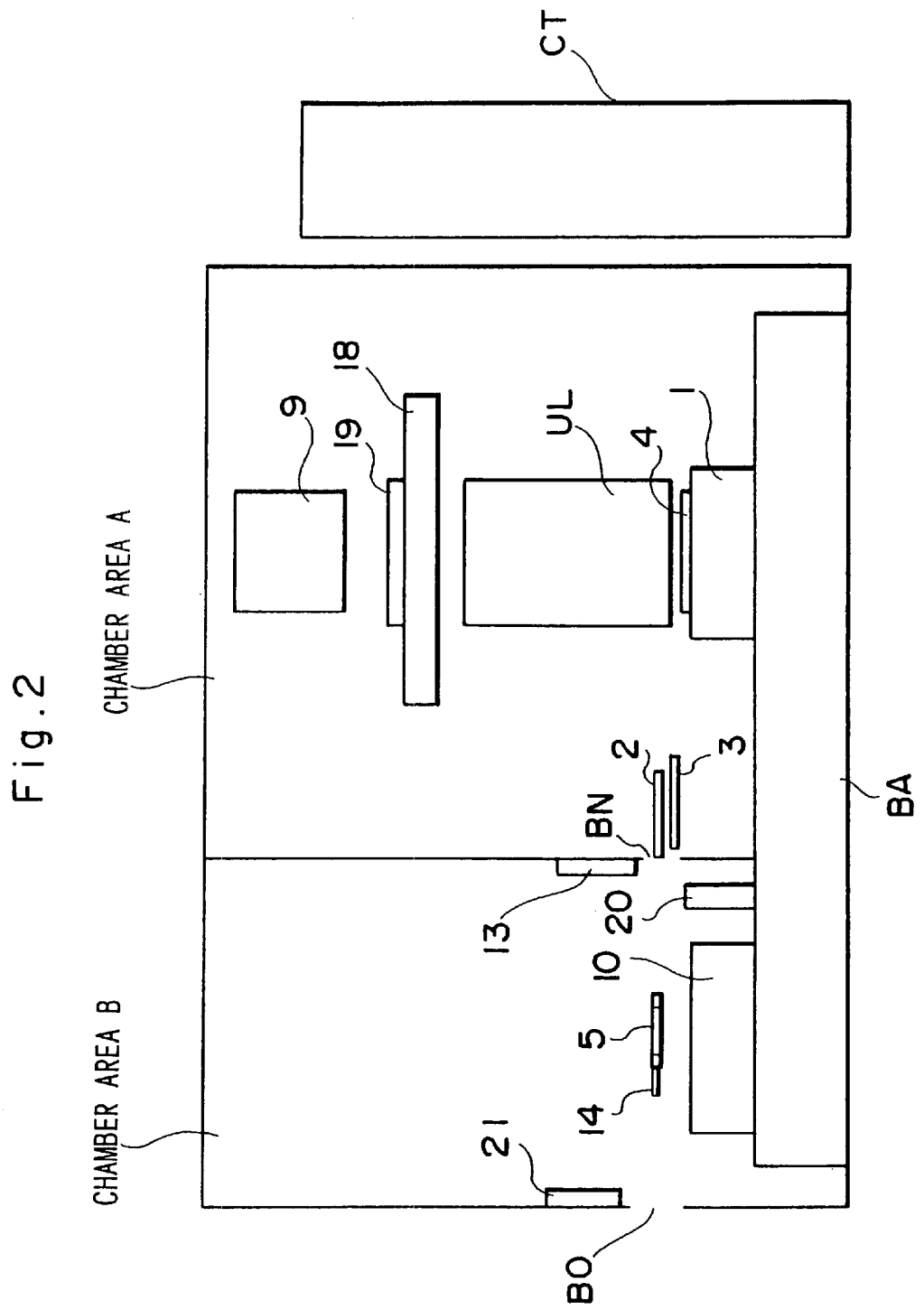
FIG. 2 is a schematic view of the exposure apparatus as viewed from the front side thereof.

One embodiment of the present invention will be now described. FIG. 1 schematically shows the overall construction of an exposure apparatus according to the present embodiment, as viewed from the top face of the apparatus. FIG. 2 is a schematic view of the present exposure apparatus as viewed from the front side thereof.

Figure 7:
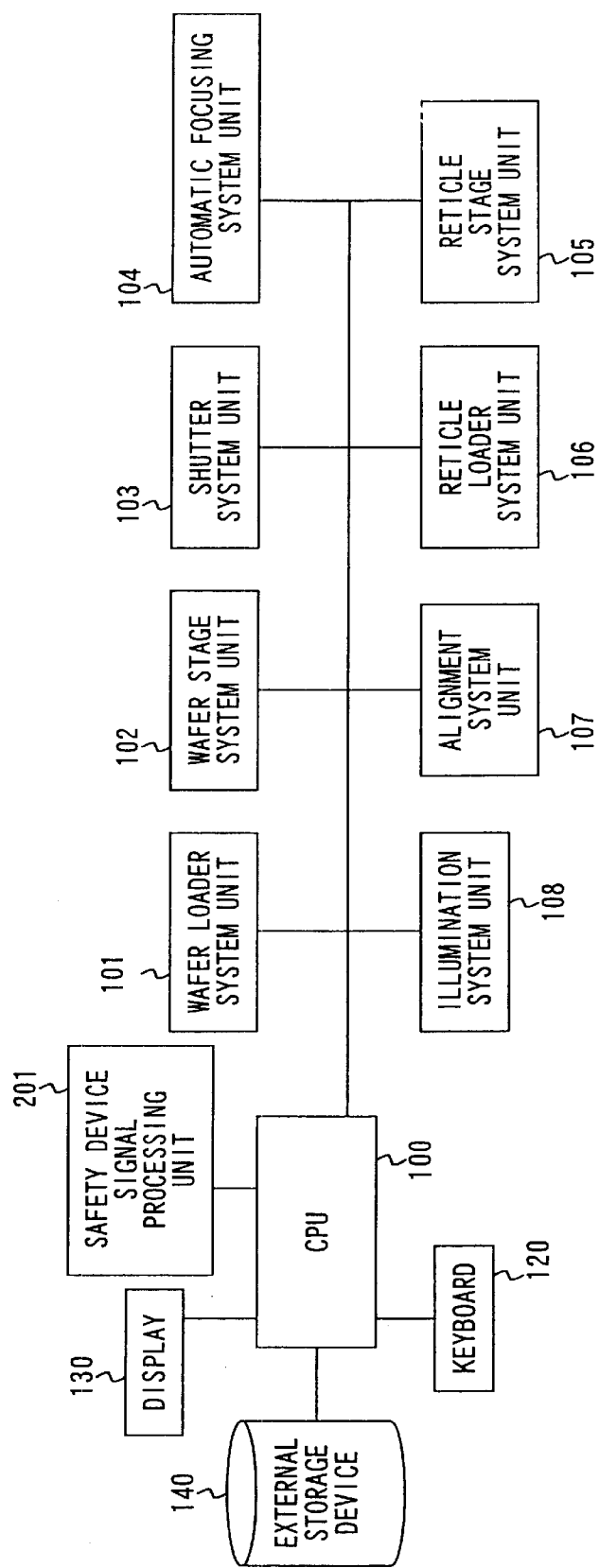
FIG. 7 is a block diagram showing an electric circuit arrangement of the exposure apparatus.

The exposure apparatus of the present embodiment consists of a chamber, or housing (or room body or casing) MC in which respective units 101–108 and others (FIG. 7) are stored, a light source portion LS including a light source 16, a shutter mechanism 17 and others (FIG. 3), and a control portion (controller) CT including control terminals 120, 130, CPU 100 and others (FIG. 7).

In the housing MC, the temperature and cleanliness level of the inside of the housing are controlled by a housing control portion MCC (second control portion). The light source portion LS generates and controls light used for exposure. The control portion CT (first control portion) performs controls of the whole apparatus, including safety control.

Next, each portion of the apparatus will be explained. The housing MC covers a chamber area A and a chamber area B. Namely, the interior of the housing MC is divided into the chamber area A and chamber area B. A substrate holding system and a projection optical system are installed in the chamber area A. The substrate holding system consists principally of a substrate stage 1, a loading arm 2, and an unloading arm 3. The substrate stage 1 is mounted on a base BA as shown in FIG. 2, so as to hold a substrate 4 as an object to be processed, such that the substrate 4 is movable in a plane perpendicular to the optical axis of the projection optical system, and in the direction of the optical axis. The loading arm 2 and unloading arm 3 transport the substrate 4 between the chamber area B and the substrate stage 1.

Figure 3:
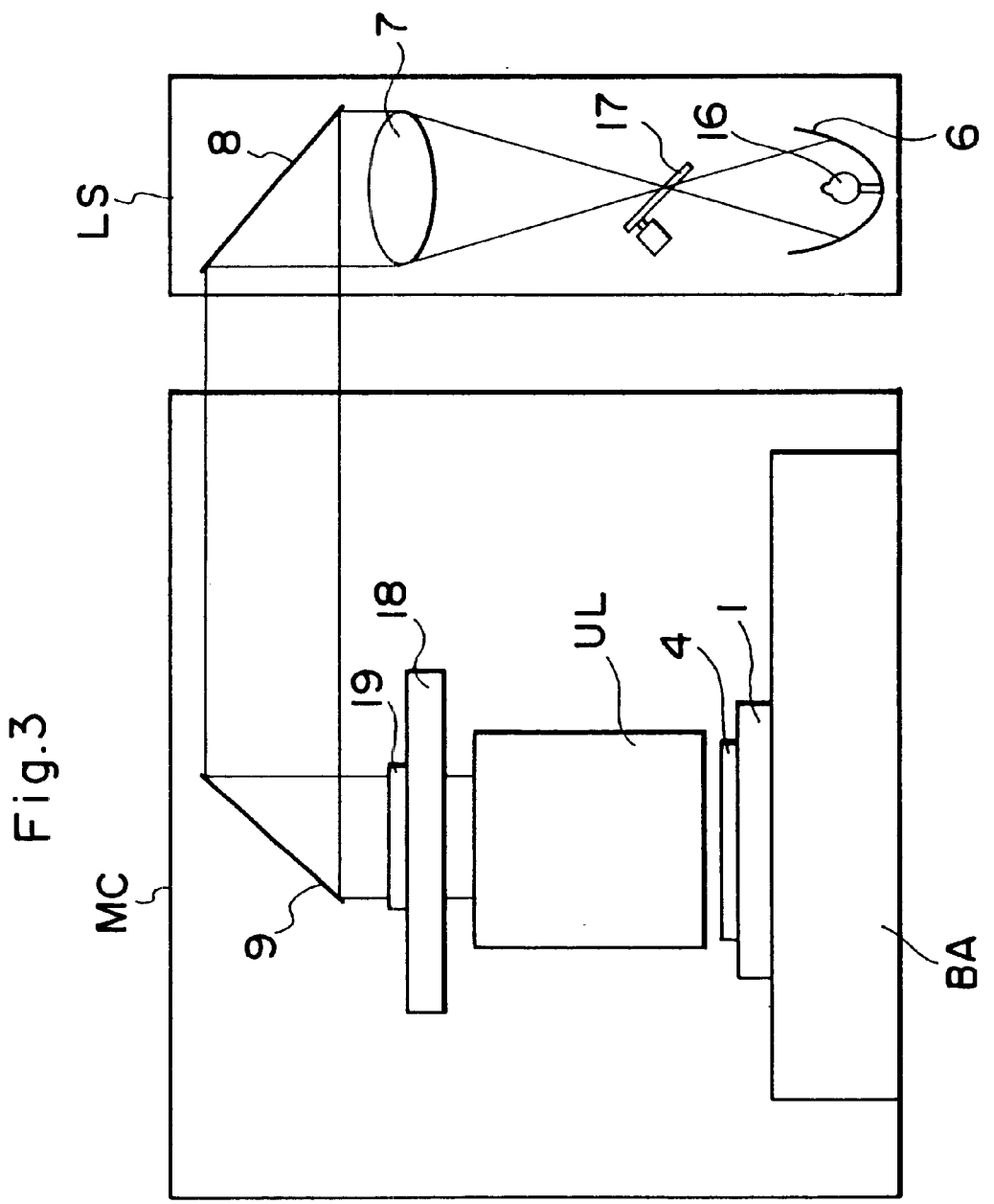
FIG. 3 is a schematic cross-sectional view of a projection optical system of the exposure apparatus.

As shown in FIG. 3, the projection optical system consists principally of an elliptic mirror 6, relay lens 7, dichroic mirrors 8, 9, projection lens UL and other components. The projection optical system functions to project a pattern onto the substrate by exposing the substrate with projecting exposure light. In the chamber area B, an inline port 10 and a transport arm 5 are mainly provided. The main function of the inline port 10 and transport arm 5 is to pass and receive the substrate 4 to and from the outside of the apparatus. Also, the transport arm 5 has a function of adjusting the position of the substrate and a function of rotating the substrate.

Figure 4:
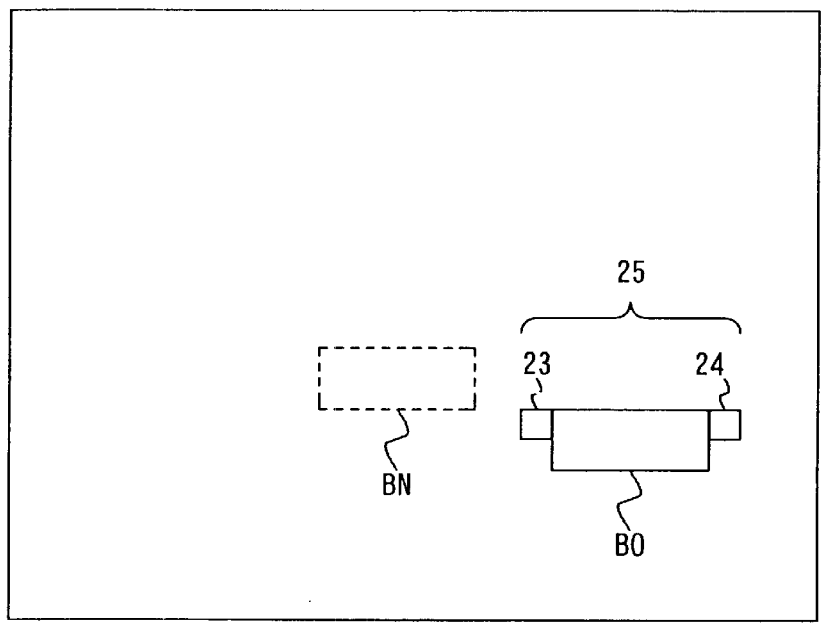
FIG. 4 is a view of one side face of the exposure apparatus through which a substrate is introduced.

FIG. 4 is a view showing inlet(s)/outlet(s) for the substrate 4, as viewed in a direction toward the left side face of the apparatus in FIG. 2. The substrate 4 enters the chamber area B of the present apparatus through an opening BO. The substrate 4 that has entered the chamber area B enters the chamber area A through an opening BN.

A partition wall 11 shuts off the chamber area A and the chamber area B from each other. The partition wall 11, except its portion where the opening BN is formed, is formed of a material having gas impermeability, heat insulating characteristic, light blocking or shielding characteristic, fastness, and non-dusting characteristic. The chamber area A communicates (or contacts) with the chamber area B through (or via) the opening BN formed in the partition wall 11. In addition, the chamber area B communicates (or contacts) with the exterior of the apparatus through (or via) the opening BO formed in the housing MC.

With the above arrangement, the chamber area A communicates with the exterior of the apparatus via the partition wall 11 and the chamber area B, and is therefore unlikely to be influenced by environmental changes, such as a temperature change and air flow, that occur in the exterior of the apparatus. At the same time, the partition wall 11 and chamber area B prevent particles from entering the chamber area A.

In the present embodiment, doors 21, 13 are provided at the openings BO, BN so as to reduce influences by environmental changes at the outside of the apparatus and entry of particles through the openings. Namely, the doors 21, 13 close the openings BO, BN except when the substrate 4 passes through the openings, so that the inside of the apparatus is less likely to be influenced by environmental changes at the outside of the apparatus, and external particles.

In the present embodiment, a partition for separating the areas from each other is provided for ensuring the safety of the operator. Thus, the partition is supposed to prevent the operator from moving between the areas without being aware of it. To this end, it is preferable that a partition wall having a not-gapped and hard or rigid structure and no opening be provided at a boundary between the areas.

Meanwhile, a transportation path(s) of the object to be processed and an optical path for exposure are present within the apparatus, and the partition is often provided with an opening(s), or the like, due to the limit of the transportation path and optical path, as is the case with the partition wall 11. However, even a partition member with an opening (s) is able to prevent movement of the operator between areas.

Preferably, the partition for preventing movement of the operator between areas is a tangible member which the operator is able to actually touch, like the partition wall as described above. Namely, the partition is preferably a tangible, physical thing. A partition formed by something non-tangible, however, may be also employed according to the present invention. Some modified examples of the partition will be introduced below.

As a tangible partition, an obstacle or barrier may be provided at the boundary of the areas, to serve as a partition for preventing movement of the operator. For instance, a net, lattice, or the like, is provided at the boundary of areas, so as to prevent movement of the operator between the areas. This type of partition, however, is disadvantageous in terms of gas permeability, and lack of abilities to insulate heat and block light.

Another type of partition prevents movement of the operator between areas by arousing an attention of the operator. In this case, the partition need not extend over the entire area of the boundary between the areas. Accordingly, an obstacle with a sufficiently large height, which cannot be missed by the operator, may be used as a partition. A bar or rod may be located in a part of the boundary, to provide a partition. This type of partition is disadvantageous in terms of gas permeability, and lack of abilities to insulate heat and block light. In addition, there is a possibility that a part of the body of the operator passes over the boundary plane as described above, because of carelessness of the operator.

Figure 8:
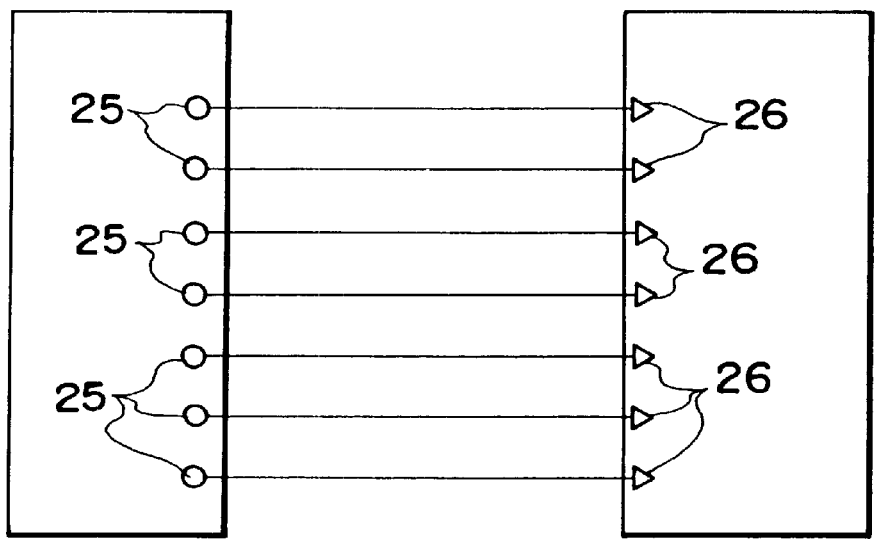
FIG. 8 is a view showing an example of a partition using a plurality of photoelectric sensors.
Figure 9:
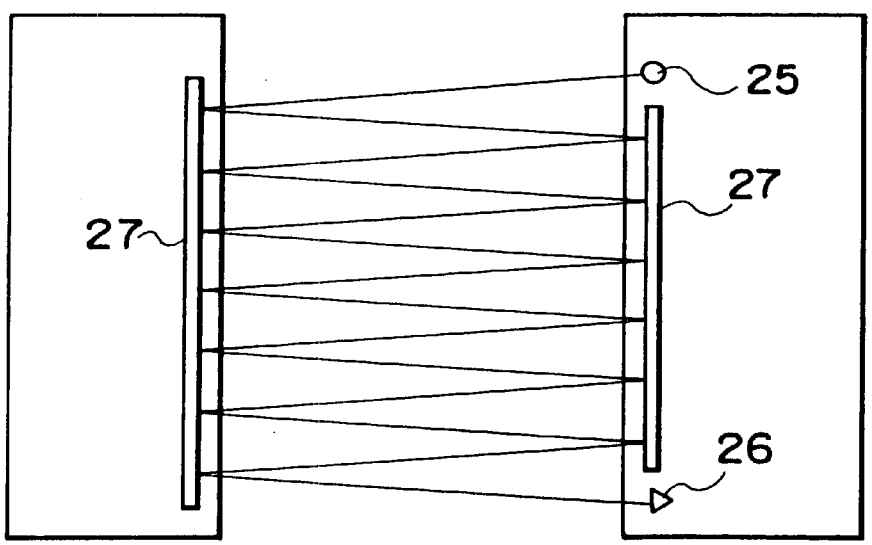
FIG. 9 is a view showing an example of a partition using a single photoelectric sensor.
Figure 10:
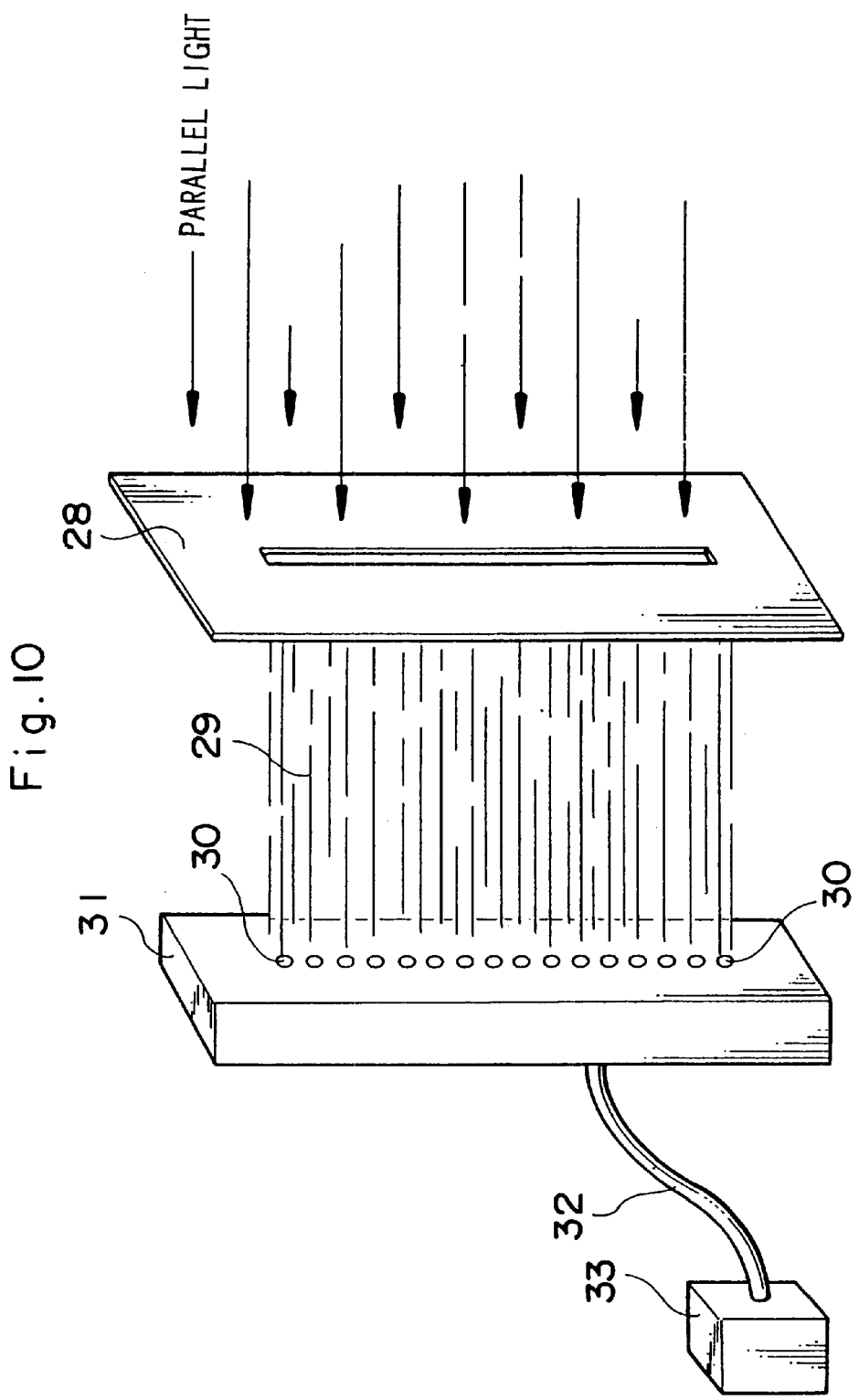
FIG. 10 is a view showing an example of a partition using beams of detection light formed into a planar shape.

As an example of non-tangible partition, a sensor, or the like, may be used. Referring to FIGS. 8, 9, and 10, there will be described the case where a photoelectric sensor is used as a partition.

In FIG. 8, a pair of light transmitting portion (light emitting portion) 25 and light receiving portion 26 of a photoelectric sensor is provided. The sensor is positioned so that it can detect a part of a body of an operator when the body part enters a part of the boundary between the areas. The sensor sends a signal to the control portion CT when it detects a part of the operator entering a part of the boundary between the areas. Upon receipt of the signal, the control portion CT controls driving of certain components in the two areas that are partitioned by the sensor.

The size of the region that can be detected by the pair of photoelectric sensors is determined by the size or diameter of a beam of detection light emitted by the photoelectric sensor. Since a single beam of detection light generally has a small diameter, a plurality of beams of light need to be arranged with as high density as possible, to avoid any failure in detection, so that the light beams are used as a partition of the areas.

The plural beams of light may be arranged with high density in the manners as follows. For instance, a plurality of pairs of photoelectric sensors are located at the boundary between one area and another area, as illustrated in FIG. 8, or a single beam of light for detection is guided by a mirror 27 so that the light beam reciprocates a large number of times in the boundary between one area and another area, as illustrated in FIG. 9.

It is also possible to monitor the entire area of the boundary by using beams of detection light formed into a planar (or plate) shape. In FIG. 10, parallel light PL emitted from the right-hand side is incident upon a slit plate 28. A light-receiving portion 31 receives the beams of detection light 29 that have passed through a slit of the plate 28 to be formed into a planar shape. The light-receiving portion 31 is provided with a plurality of light-receiving windows 30 each formed by a cross section of an optical fiber that leads a beam of detection light to a detecting device. The light-receiving windows 30 are located so as to fill an area that receives the beams of detection light 29. The detection light received by the light-receiving windows 30 is transmitted to the detecting device 33 through the above-described optical fibers that are bundled together in a binding portion 32. The detecting device 33 converts a change in the intensity of the whole bundle of detection light beams 29, into an electric signal, thereby to detect the change. When part of the beams of detection light is interrupted by a human body, or the like, the intensity of the detection light 29 is lowered, and entry of the human body can be thus detected.

While the photoelectric sensor is used in the above example, other types of sensors, such as an ultrasonic sensor that detects an object using reflecting sound, infrared sensor that detects infrared rays generated by a human body, and a proximity sensor that detects a change in the electrostatic capacity of a space when a human body approaches the space, may also be used.

Since the operator cannot directly recognize the partition using the sensor, it is desirable to provide an indication of the position of the partition at a location, such as a door, that can be easily seen by the operator.

While two areas are provided in the illustrated embodiment, the present invention is not limited to this arrangement, but the interior of the apparatus may be divided into three or a larger number of areas.

For example, an inside inspecting operation area A32 (FIG. 1) that is accessible from a door A3 of the chamber area A is provided. The area A32 is partly defined (or separated) by a partition A31 (dotted line in FIG. 1) so that the operator can perform an inside inspecting operation with no problem, without being exposed to any danger caused by the substrate stage 1, loading arm 2, unloading arm 3, and exposure light. The partition is preferably formed of a material, such as glass, that is transparent with respect to inspection light, but absorbs exposure light.

As described above, various types of partitions are available, some of which have disadvantages. By selecting an appropriate material for a partition, as is the case with the chamber area A32, however, the apparatus can be kept operating while assuring the safety of the operator.

As described above, the operator is free from any danger caused by the substrate stage 1, loading arm 2, unloading arm 3, and exposure light in the chamber area A32. Thus, even if the door A3 is opened, the substrate stage 1, loading arm 2, and the unloading arm 3 are kept operating, and the exposure light is not interrupted. No danger arises from the substrate stage 1, loading arm 2 and the unloading arm 3 because the movement of the operator does not interfere with the operations of the substrate stage 1, loading arm 2 and the unloading arm 3.

As explained above with respect to the chamber area A32, the interior of the apparatus may be divided into a larger number of areas than two, in view of driven parts (or portions) and operating efficiency of the apparatus. Thus, the present invention is applicable to the case where the interior of the apparatus is divided into a larger number of areas.

Also, the number of driven parts (or portions) that are to be stopped can be reduced by increasing the number of areas, as described above.

The exposure apparatus of the present embodiment may be produced (or manufactured) by mounting the projection optical system, substrate stage 4, substrate transport devices 2, 3, 5, 10 and 20, light source portion LS, control portion CT, and others, on its main body in the following manner. The assembling of the whole apparatus requires mounting of the above devices and systems on the main body, piping and wiring, and overall adjustments (electric adjustment, confirmation of operations, and so on). The projection optical system is fabricated by assembling a plurality of lenses with optical adjustment, and additional optical adjustment is required when the projection optical system is installed on the main body of the exposure apparatus. The substrate transport devices and substrate stage 4 are produced by assembling a multiplicity of mechanical components with required mechanical adjustments. The apparatus is desirably produced in a clean room in which the temperature and pressure are controlled to be close to those in actual use, and the cleanliness is controlled to an appropriate level.

Next, the flow of the substrate 4 will be described. In FIG. 1, the flow of the substrate 4 is indicated by arrows.

In the present embodiment, the substrate 4 enters the inline port 10 of FIG. 1 through the opening BO. At the inline port 10, the temperature of the substrate 4 is adjusted by a temperature control mechanism 12. The substrate 4 is then passed onto the loading arm 2 by means of the transport arm 5. During the transportation, the substrate 4 is positioned by a positioning hammer 14. The loading arm 2 carries the substrate 4 to a location close to the substrate stage 1. At the same time, the substrate stage 1 moves to the vicinity of the loading arm 2, and then receives the substrate 4.

In the meantime, a reticle 19 is illuminated by illumination light emitted by the light source 16, as shown in FIG. 2. A pattern image of the reticle 19 is projected by exposure onto the substrate 4 on the substrate stage 1 with the projection optical system UL interposed therebetween, so that a resist material on the substrate 4 is exposed to image light transmitted through the projection optical system UL, and a latent image of the pattern is formed on the substrate 4. After the exposure operation, the substrate 4 is carried by the unloading arm 3, holding arm 20, and transport arm 5, to move onto the inline port 10.

The processing is performed in the manner as described above. In the apparatus of the present embodiment, the substrate 4 is supplied from the outside of the apparatus through the inlet/outlet, and ejected through the same inlet/outlet. An apparatus having separate inlet and outlet may operate by a similar control method, to provide similar effects. Also, similar effects may be provided by an apparatus wherein a plurality of substrates 4 stored in a cassette are set in the inside thereof.

Next, safety devices will be described.

Figure 5:
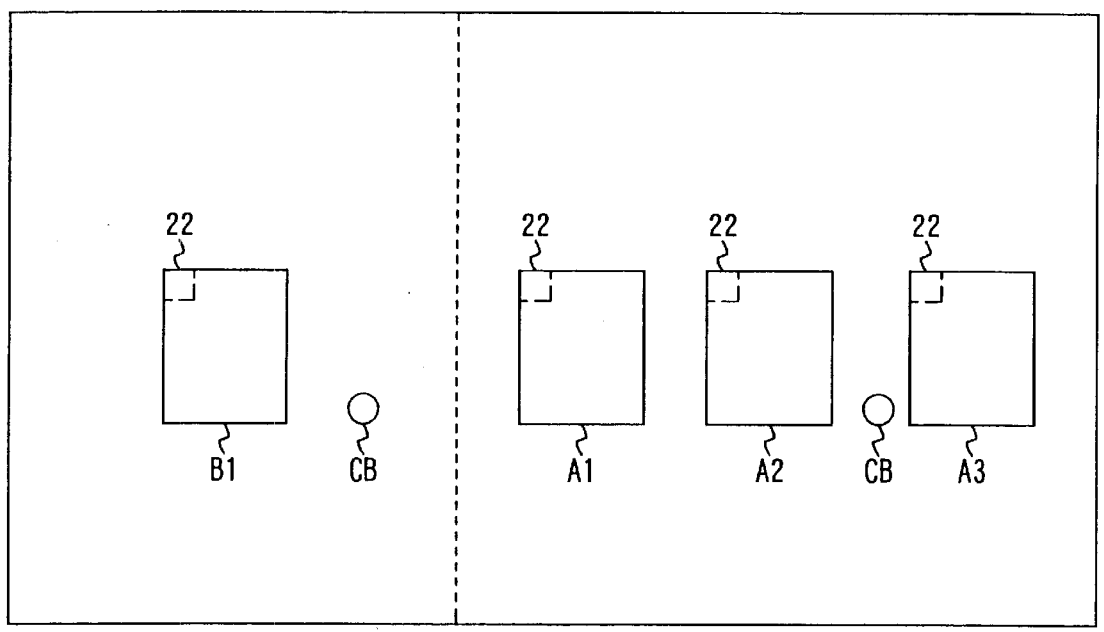
FIG. 5 is a front view of a chamber portion of the exposure apparatus.

In the present embodiment, the chamber MC is provided with doors A1, A2, A3 and B1 for allowing operations by the operator, as shown in FIG. 5. Each door is equipped with a microswitch 22. The control portion CT is adapted to receive the outputs of the microswitches 22 to determine which door(s) is/are being opened. The details will be described later.

While four doors are provided in the present embodiment, an increased or reduced number of doors may be provided so as to yield a similar effect by a similar method.

While the microswitches are used in the present embodiment, photoelectric sensors, for example, may also be used. In one example wherein a photoelectric sensor is used, a light-emitting portion of the sensor is provided at a door, and a light-receiving portion is located so that it receives light emitted by the light-emitting portion when the door is closed, and does not receive the light when the door is opened, thereby to detect an open/closed state of the door based on a signal received from the photoelectric sensor.

In the meantime, a photoelectric sensor 25 consisting of a pair of a light-emitting portion 23 and a light-receiving portion 24 is installed at the opening BO, as shown in FIG. 4. The light-emitting portion 23 emits a beam of light for detection, and the light-receiving portion 24 receives the beam of light and converts it into an electric signal. The electric signal is then transmitted to the control portion CT. Upon receipt of the electric signal, the control portion CT is able to sense or detect entry of an object into a space between the light-emitting portion 23 and the light receiving portion 24, or removal of an object that has been present in the space.

As described above, the object to be processed, such as the substrate 4, passes through the opening BO. In this normal state, the object passing through the opening BO, namely, the one to be processed in this case, should not be detected as an abnormality. When a human body, or the like, passes through the opening BO while the components inside the chamber area B are in operation, however, the object passing through the opening BO, i.e., the human body in this case, should be detected as an abnormality. The light-emitting portion 23 and the light-receiving portion 24 are located so that the optical axis passes over a range as broad as possible, without being interrupted by the object to be processed that is passing through the opening BO. The photoelectric sensor 25 thus located functions as an object sensor for detecting only an undesired or non-processed object entering from the outside, as an abnormality. The methods of detecting entry of an object over a broad range by means of the photoelectric sensor are as described above.

By use of the photoelectric sensor 23, 24, the control portion CT is able to detect entry of an abnormal object, such as a human body, into the opening. The positions of the light-emitting portion 23 and light-receiving portion 24 may be switched or reversed provided that they provide the same detection region. In this case, too, the same effect can be obtained.

While the photoelectric sensor is used in the above example, the above-described other types of sensors, such as an ultrasonic sensor, infrared sensor, and a proximity sensor, that can detect entry of an object, may be used to provide a similar effect.

Furthermore, a vibration sensor that detects vibration of a human body, a gas sensor that detects carbon dioxide or other gas generated by a human body, or a humidity sensor that detects the humidity generated by a human body, may also be used.

Figure 6:
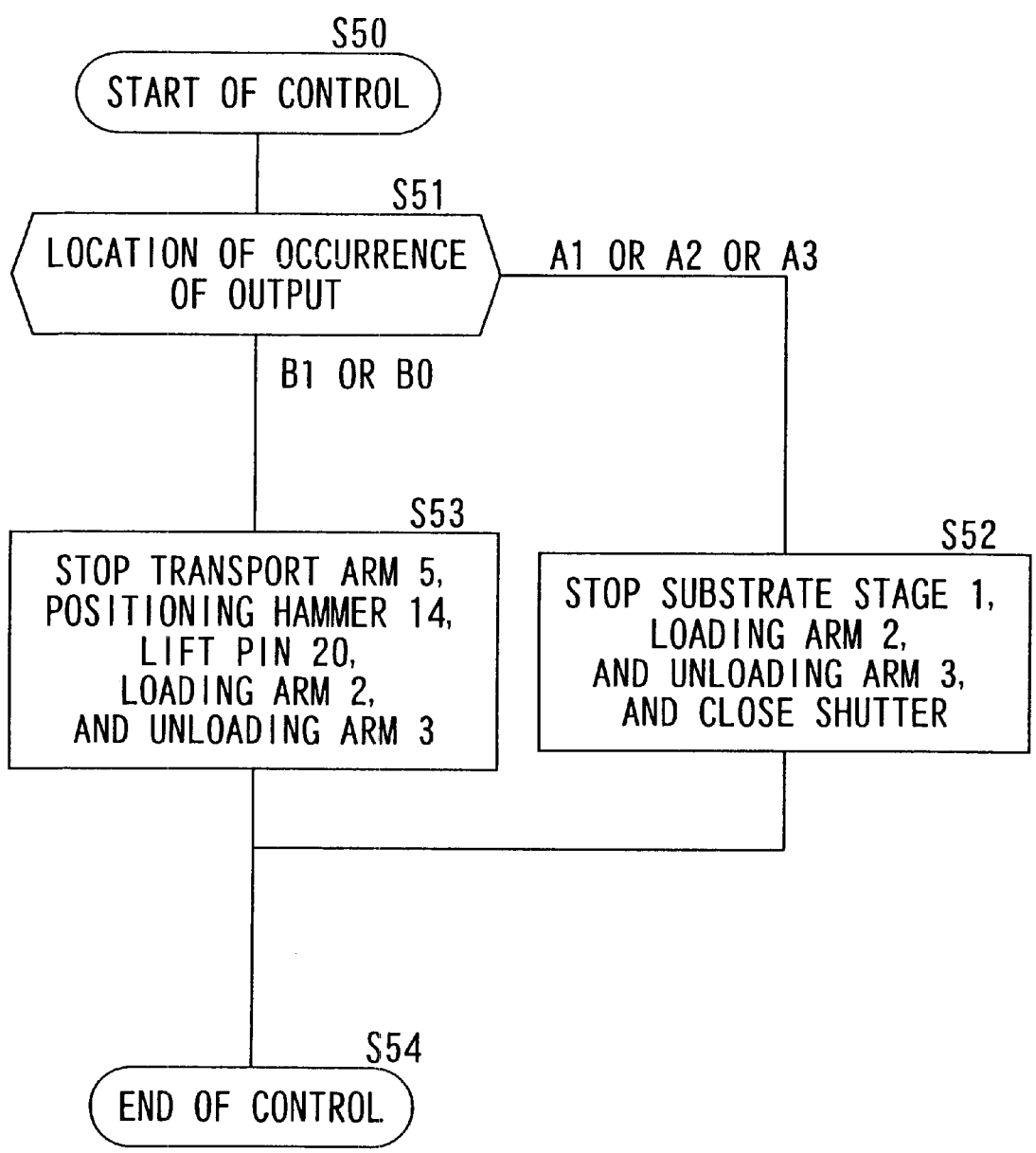
FIG. 6 is a flowchart showing the control of safety devices of the exposure apparatus.

FIG. 6 is a flowchart showing the safety control of the present embodiment. The safety control that is started upon opening of a door will be described with reference to the flowchart of FIG. 6.

In the present embodiment, the housing MC is provided with doors A1–A3 corresponding to the chamber area A, and microswitches 22 that generate signals indicating opening of the respective doors A1–A3, to the control portion CT. The housing MC is also provided with a door B1 corresponding to the chamber area B, and a microswitch 22 that generates a signal indicating opening of the door B1, to the control portion CT. In addition, the photoelectric sensor 25 is provided as an object sensor for sensing an object other than an object to be processed when it enters the chamber area B from the outside through the opening BO, and sending a signal indicative of the entry of the object, to the control portion CT.

The control portion CT determines whether the output of the microswitch 22 corresponds to the chamber area A or the chamber area B (step S51). Where the output of the microswitch 22 corresponds to the chamber area A, namely, where the control portion CT receives an output of one of the microswitches 22 provided at the doors A1, A2, A3, the following control is performed. After receiving the output, the control portion CT immediately stops driving the substrate stage 1, loading arm 2, and the unloading arm 3, and operates the shutter mechanism so as to shut off exposure light. The components in the chamber area B, on the other hand, need not be stopped since the operations of these components will not incur any danger on the operator who is present in the chamber area A (step S52).

When the control portion CT receives an output from the microswitch 22 provided at the door B1, or an output from the above-described object sensor provided at the opening BO, the following control is performed. In response to the output signal, the control portion CT immediately stops driving the transport arm 5 and the holding arm 20. Since the loading arm 2 and unloading arm 3 located in the chamber area A may endanger the operator present in the chamber area B, the control portion CT also stops these arms 2, 3 (step S53).

When the door corresponding to the chamber area B is opened, as in step S53, the loading arm 2 and unloading arm 3 located in the chamber area A are stopped, so as to ensure the safety of the operator. When the door B1 corresponding to the chamber area B is opened, the temperature control mechanism 12 is not stopped, because the operation of the mechanism 12 does not cause any problem on the safety of the operator.

The driven parts or components that are to be stopped and driven parts that are not stopped are set in the manner as described later, using a keyboard 120 and a display 130 provided in the control portion CT.

FIG. 7 is a block diagram showing an electric circuit arrangement of the present apparatus. A CPU 100 processes signals from a safety device signal processing unit 201, so as to control each of units 101, 102 and others as needed. On the other hand, the processing of the CPU 100 is determined by programs and control values (or parameters) stored in an external storage device 140. The keyboard 120 and display 130 may be used for confirming and changing the programs and control values stored in the external storage device 140. The driven parts that are to be stopped and the driven parts that are not stopped are set in a control value setting program stored in the external storage device 140, using the keyboard 120 to start the program, while monitoring it on the display 130.

Where exposure light is not to be shut off when a door corresponding to the chamber area A is opened, for example, setting of the control values may be changed using the keyboard 120 and the display 130 located in the control portion CT.

While a pattern image is transferred onto the substrate by exposing the substrate with light in the illustrated embodiment, X rays or electron beams may be used for exposure. An exposure apparatus using X rays or electron beams is adapted to carry out a process as follows that corresponds to the process for shutting off light from the light source. Where X rays are used, the process is to stop supplying energy to an X-ray generating source. Where electron beams are used, the process is to stop supplying energy to an electron-beam generating source.

If the driven parts that are to be stopped in an area are being stopped when a door corresponding to the area is opened, the safety control is not performed. The operating states of the driven parts can be confirmed on the display 130, or the like.

Furthermore, a lock mechanism for inhibiting each door from opening may be provided in order to prevent the door from being opened by mistake. The lock mechanism may be provided with a detachable key that selectively places the door in a locked state or unlocked state. In this case, a mechanism may be provided for generating an output when the key is pulled out, so as to permit control similar to that of the flowchart shown in FIG. 6, which is included in the range of the present invention.

In the condition where the above-described key is pulled out, certain driven parts are stopped. If the operator enters the inside of the apparatus while bringing the key with him/her, therefore, no danger arises from re-starting of the driven parts even in the case where the door is closed by mistake.

While the exposure apparatus as one of semiconductor manufacture apparatuses has been described in the illustrated embodiment, by way of example, the present invention is not limited to this type of apparatus. Namely, the present invention is generally applicable to any type of processing apparatus wherein the interior is divided into a plurality of areas, and various operations of the apparatus need to be controlled to provide the highest efficiency and safety when the operator enters each of the areas.

What is claimed is:

1. A processing apparatus that processes an object to be processed, and includes at least first and second processing devices that are separated from each other by a partition, comprising:
   (A) a first housing that covers the first processing device;
   (B) a second housing that covers the second processing device, the second housing having a first door device that is capable of opening the second housing;
   (C) a conveyor that conveys the object between the first processing device and the second processing device, the first housing covering at least a part of the conveyor; and
   (D) a controller having a CPU to control the first and second processing devices in accordance with a state of the first door device, the controller stopping at least a part of the second processing device and the conveyor, and not stopping at least a part of the first processing device while the first door device is opening the second housing.

2. A processing apparatus as defined in claim 1, wherein said first door device includes a sensor that detects an opened state of the second housing.

3. A processing apparatus as defined in claim 1, wherein said partition comprises a partition wall that is formed of a material having at least one of gas impermeability, heat insulating ability, and light blocking ability.

4. A processing apparatus as defined in claim 3, wherein said partition wall is formed with an opening through which the object to be processed passes to move between the first processing device and the second processing device.

5. A processing apparatus as defined in claim 1, wherein the object to be processed is a substrate.

6. A processing apparatus as defined in claim 1, wherein said controller controls at least one of a temperature and a cleanliness level of at least one of the first housing and the second housing.

7. A processing apparatus as defined in claim 1, wherein a temperature control device that controls a temperature of the object to be processed is provided in at least one of the first processing device and the second processing device.

8. A processing apparatus as defined in claim 7, wherein the controller does not stop the temperature control device when the first door device opens the second housing.

9. A processing apparatus as defined in claim 1, wherein one of the first processing device and the second processing device includes a position control device that adjusts a position of the object.

10. A processing apparatus as defined in claim 1, wherein one of the first processing device and the second processing device includes an exposure processing device to transfer a pattern onto the object to be processed with exposure light.

11. A processing apparatus as defined in claim 10, wherein the exposure light is shut off when the first door device opens the second housing.

12. A processing apparatus as defined in claim 1, further comprising:
   an opening provided in the second housing to receive the object from an outside of the processing apparatus.

13. A processing apparatus as defined in claim 1, wherein the first housing includes a second door device that is capable of opening the first housing.

14. A processing apparatus as defined in claim 13, wherein the controller stops at least a part of the first processing device and does not stop at least a part of the second processing device when the second door device opens the first housing.

15. A method of controlling a processing apparatus including a first processing device and a second processing device and a first housing and a second housing covering the first and second processing devices respectively to process an object, comprising the steps of:
   providing a partition that separates the first processing device from the second processing device, the first processing device having a first unit arranged in a vicinity of the partition and a second unit;
   receiving a state of a door device that is capable of opening the second housing;
   stopping driving of at least a part of the second processing device and the first unit while the door device is opening the second housing; and
   keeping driving of the second unit.

16. A method as defined in claim 15, further comprising the steps of:

receiving a state of the first housing;

stopping driving of at least a part of the first processing device in accordance with the state of the first housing; and keeping driving of at least a part of the second processing device.

17. A method as defined in claim 15, further comprising conveying an unprocessed object from an outside of the processing apparatus to the second processing device through an aperture formed on the second housing, the aperture being different from the door device.

18. A method as defined in claim 15, wherein the second unit comprises a temperature control device that controls a temperature of the object.

19. A method as defined in claim 15, wherein the processing apparatus further includes a conveyor that conveys the object between the first processing device and the second processing device, and further comprising the step of stopping driving of the conveyor while the door device is opening the second housing.

20. A method of manufacturing a processing apparatus that processes an object to be processed, and includes first and second processing devices, comprising the steps of:

(A) providing a partition that separates the first processing device from the second processing device, the first processing device having a first unit arranged in a vicinity of the partition and a second unit;

(B) providing a first housing that covers the first processing device;

(C) providing a second housing that covers the second processing device, the second housing having a first door device that is capable of opening the second housing; and (D) providing a controller having a CPU to control the first and second processing devices in accordance with a state of the first door device, the controller stopping at least a part of the second processing device and the first unit, and not stopping the second unit while the first door device is opening the second housing.

21. A method as defined in claim 20, wherein the first housing includes a second door device that is capable of opening the first housing.

22. A method as defined in claim 21, wherein the controller stops at least a part of the first processing device and does not stop at least a part of the second processing device when the second door device opens the first housing.

23. A method as defined in claim 20, wherein one of the first processing device and the second processing device includes an exposure processing device to transfer a pattern onto the object to be processed with exposure light.

24. A method as defined in claim 23, wherein the exposure light is shut off when the first door device opens the second housing device.

25. A method as defined in claim 23, wherein the second unit comprises a temperature control device that controls a temperature of the object.

26. A method as defined in claim 20, further comprising the step of providing a conveyor that conveys the object between the first processing device and the second processing device, and wherein the controller stops driving of the conveyor while the first door device is opening the second housing.

* * * * *